US012078000B2

(12) United States Patent
Maas et al.

(10) Patent No.: US 12,078,000 B2
(45) Date of Patent: Sep. 3, 2024

(54) WINDOW FRAME INSERT FOR AN EXISTING WINDOW FRAME AND METHOD OF USING THE SAME

(71) Applicant: SABIC GLOBAL TECHNOLOGIES B.V., Bergen op Zoom (NL)

(72) Inventors: Christianus Johannes Jacobus Maas, Geleen (NL); Reinhard Tag, Geleen (NL); Michel Egbertus Henricus van Acht, Geleen (NL); John Hendricus van der Wal, Geleen (NL); William Andrews McDonough, Charlottesville, VA (US); Aly G. Khalifa, Raleigh, NC (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 288 days.

(21) Appl. No.: 17/604,942

(22) PCT Filed: May 14, 2020

(86) PCT No.: PCT/EP2020/063475
§ 371 (c)(1),
(2) Date: Oct. 19, 2021

(87) PCT Pub. No.: WO2020/229605
PCT Pub. Date: Nov. 19, 2020

(65) Prior Publication Data

US 2022/0213724 A1 Jul. 7, 2022

(30) Foreign Application Priority Data

May 16, 2019 (EP) .................................... 19174991

(51) Int. Cl.
*E05D 1/02* (2006.01)
*E06B 3/26* (2006.01)
*E06B 3/54* (2006.01)

(52) U.S. Cl.
CPC .............. *E05D 1/02* (2013.01); *E06B 3/2605* (2013.01); *E05Y 2900/148* (2013.01); *E06B 3/5418* (2013.01)

(58) Field of Classification Search
CPC ... E05D 1/02; E06B 3/2605; E06B 2003/262; E06B 3/5418; E05Y 2900/148
See application file for complete search history.

(56) References Cited

U.S. PATENT DOCUMENTS 3,222,734 A * 12/1965 Punt ...................... E06B 3/2605 49/63
4,561,223 A 12/1985 Gold et al.
(Continued)

FOREIGN PATENT DOCUMENTS

WO 199515849 6/1995

OTHER PUBLICATIONS

Extended European Search Report for Application No. EP 19174991.0, Date of Issue—Nov. 19, 2019, 8 pages.
(Continued)

*Primary Examiner* — Gisele D Ford
(74) *Attorney, Agent, or Firm* — CANTOR COLBURN LLP

(57) ABSTRACT

A window frame insert for an existing window frame can comprise: a window pane comprising a thermoplastic polymer, wherein a length of the window pane is divided into a first portion and a second portion by a living hinge mechanism formed into the window pane that extends across a width of the window pane from one edge to an opposite edge such that the first portion can bend at the living hinge
(Continued)

mechanism toward the second portion, and wherein an outer edge of the window pane removably attaches to the existing window frame, and preferably wherein the first portion and the second portion have a haze value of less than or equal to 5% as determined in accordance with ASTM D1003-13, preferably less than or equal to 2%.

18 Claims, 9 Drawing Sheets

(56) References Cited

U.S. PATENT DOCUMENTS 4,799,727 A * 1/1989 Robbins .................... E05D 1/02 296/147
5,015,028 A * 5/1991 Bonnett ................. B60J 1/1823 16/225
5,050,663 A * 9/1991 Rhoads .................. B60J 1/1823 296/145
5,203,277 A * 4/1993 Norman .................. B63B 19/02 114/361
5,385,380 A 1/1995 Heavner
5,581,943 A * 12/1996 Deren ..................... E05F 11/34 464/38
2003/0108735 A1* 6/2003 Hoppe .................... F24S 20/55 428/212
2004/0221384 A1 11/2004 Tavivian
2016/0208547 A1 7/2016 Champin
2016/0299532 A1* 10/2016 Gheorghiu ........... H04B 1/3888
2018/0291949 A1* 10/2018 Le ....................... E05D 11/1028

OTHER PUBLICATIONS

International Search Report for International Application No. PCT/EP2020/063475; International Filing Date—May 14, 2020; Date of Mailing—Jul. 22, 2020; 5 pages.
Written Opinion for International Application No. PCT/EP2020/063475; International Filing Date—May 14, 2020; Date of Mailing—Jul. 22, 2020; 8 pages.

* cited by examiner

WINDOW FRAME INSERT FOR AN EXISTING WINDOW FRAME AND METHOD OF USING THE SAME

CROSS REFERENCE TO RELATED APPLICATIONS

This application is a National Stage application of PCT/EP2020/063475, filed on May 14, 2020. This application claims priority to EP Application No. 19174991.0, filed May 16, 2019, the entire contents of which are incorporated herein by reference.

BACKGROUND

In an attempt to improve the insulative efficacy of a building or home, consumers will often look to modify their existing windows. For example, single-pane windows can be replaced with double-pane windows, which will trap an additional insulative layer of air between the panes. However, such window replacements are costly and often do not justify the subsequent savings on heating and cooling.

Consumers will also apply window inserts over their existing windows, rather than opt for a full window replacement. However, these inserts are often aesthetically unattractive, ineffective, and lack basic functionality. For example, many window inserts block access to the existing window and therefore do not allow a consumer to open and close their windows as desired. Furthermore, it is not possible to clean the existing window or adjacent air gap, where dust and insects can gather. Current window inserts are also difficult to match to existing windows in the home. Differences in widths, depths and being out of square can make it difficult to cover a window sufficiently and create an insulative seal.

Accordingly, it would be desirable to provide a window frame insert that is cost-effective, insulative, easy to install, convenient, aesthetically pleasing, requires no additional gaskets or seals, and allows easy access to already existing windows.

SUMMARY

Disclosed, in various embodiments, are a window frame insert and methods of using the same.

A window frame insert for an existing window frame, the window frame insert can comprise: a window pane comprising a thermoplastic polymer, wherein a length of the window pane is divided by a living hinge mechanism, preferably formed into the window pane, that extends across a width of the window pane from one edge to an opposite edge such that a portion of the window pane can bend at the living hinge mechanism toward another portion of the window pane, and wherein an outer edge of the window pane removably attaches to the existing window frame.

For example, a window frame insert for an existing window frame can comprise: a base frame, wherein an exterior perimeter of the base frame is configured to mount to an inside surface of the existing window frame, wherein the base frame comprises a lip extending toward a center of the base frame, and preferably, wherein the lip comprises a magnetic material; a window pane comprising a thermoplastic polymer, wherein a length of the window pane is divided by a living hinge mechanism, preferably formed into the window pane, that extends across a width of the window pane from one edge to an opposite edge such that a portion of the window pane can bend at the living hinge mechanism toward another portion of the window pane, and wherein the window pane has a haze value of less than or equal to 5% as determined in accordance with ASTM D1003-13, preferably less than or equal to 2%; and wherein an outer edge of the window pane removably attaches to the lip of the base frame, preferably wherein the outer edge of the window pane attaches to the lip of the base frame.

A method of installing the window frame insert, the method comprising: adjusting a base frame of the window frame insert to fit the existing window frame, wherein an interior perimeter of the base frame comprises a lip, wherein the lip of the base frame comprises a magnetic material; mounting an exterior perimeter of the base frame inside the existing window frame; adjusting the window pane to fit the base frame; and attaching an outer edge of the window pane to the lip of the base frame, wherein a length of the window pane is divided into a first portion and a second portion by a living hinge mechanism, preferably formed into the window pane, that extends across a width of the window pane from one edge to an opposite edge such that the first portion can bend at the living hinge mechanism toward the second portion.

These and other features and characteristics are more particularly described below.

BRIEF DESCRIPTION OF THE DRAWING

The following is a brief description of the drawing wherein like elements are numbered alike and which is presented for the purposes of illustrating the exemplary embodiments disclosed herein and not for the purposes of limiting the same.

DETAILED DESCRIPTION

Figure 1:
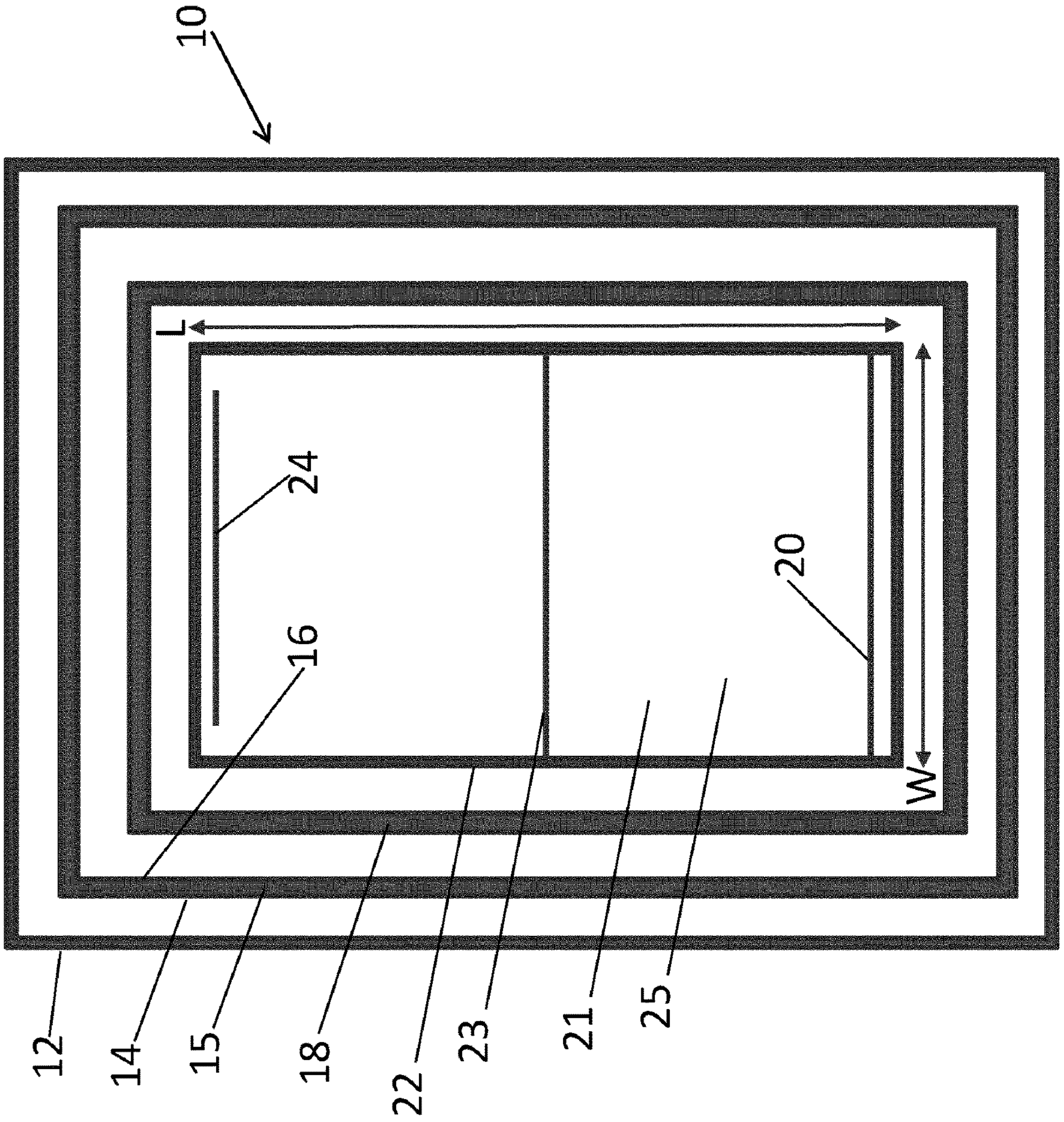
FIG. 1 is a schematic diagram representing a window frame insert for an existing window frame in a closed position.
Figure 2:
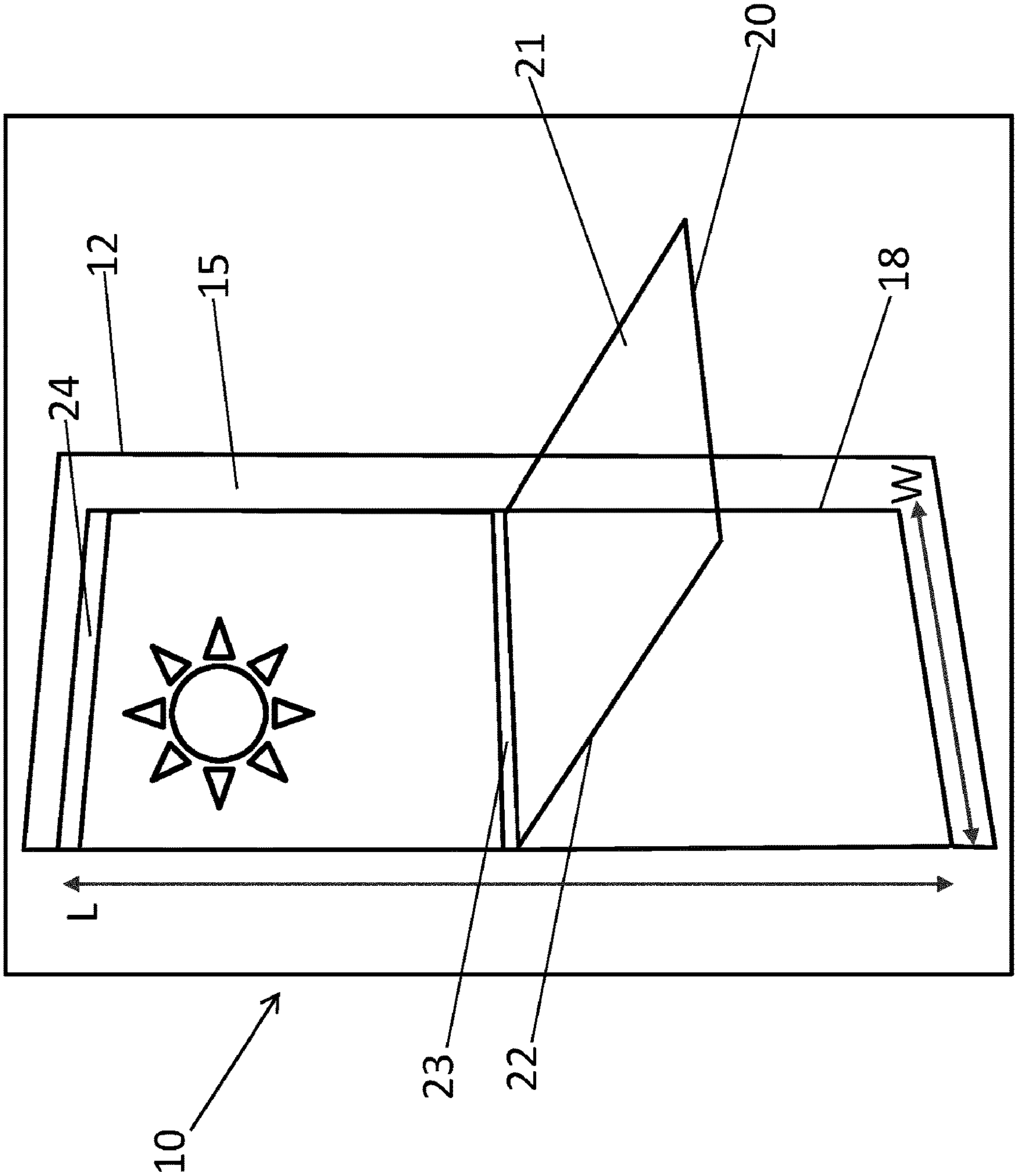
FIG. 2 is a perspective view of an embodiment of a window frame insert for an existing window frame in a partially open position.
Figure 3:
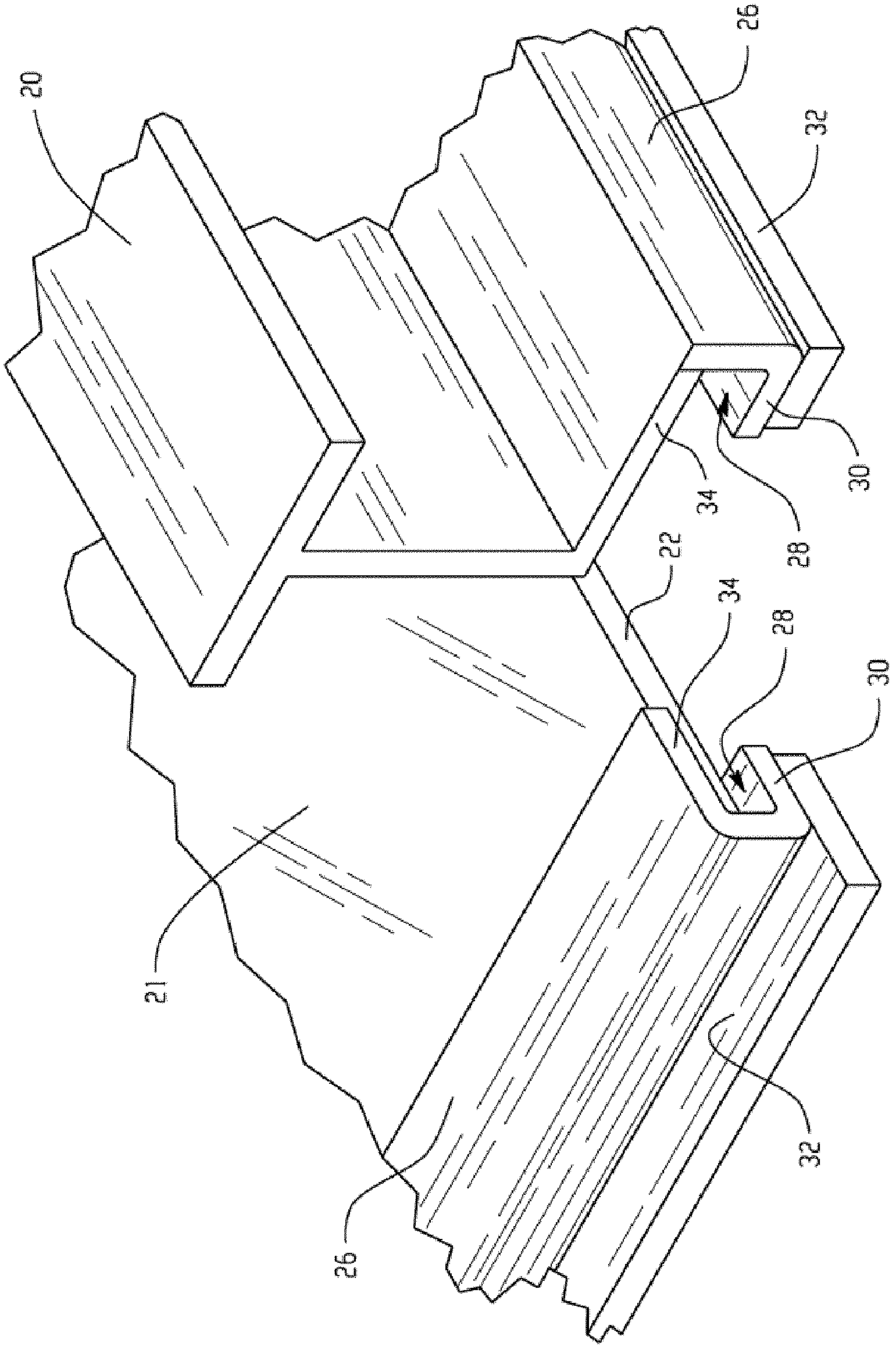
FIG. 3 is a partial exploded view of an embodiment of an inner frame member and a window pane.
Figure 4:
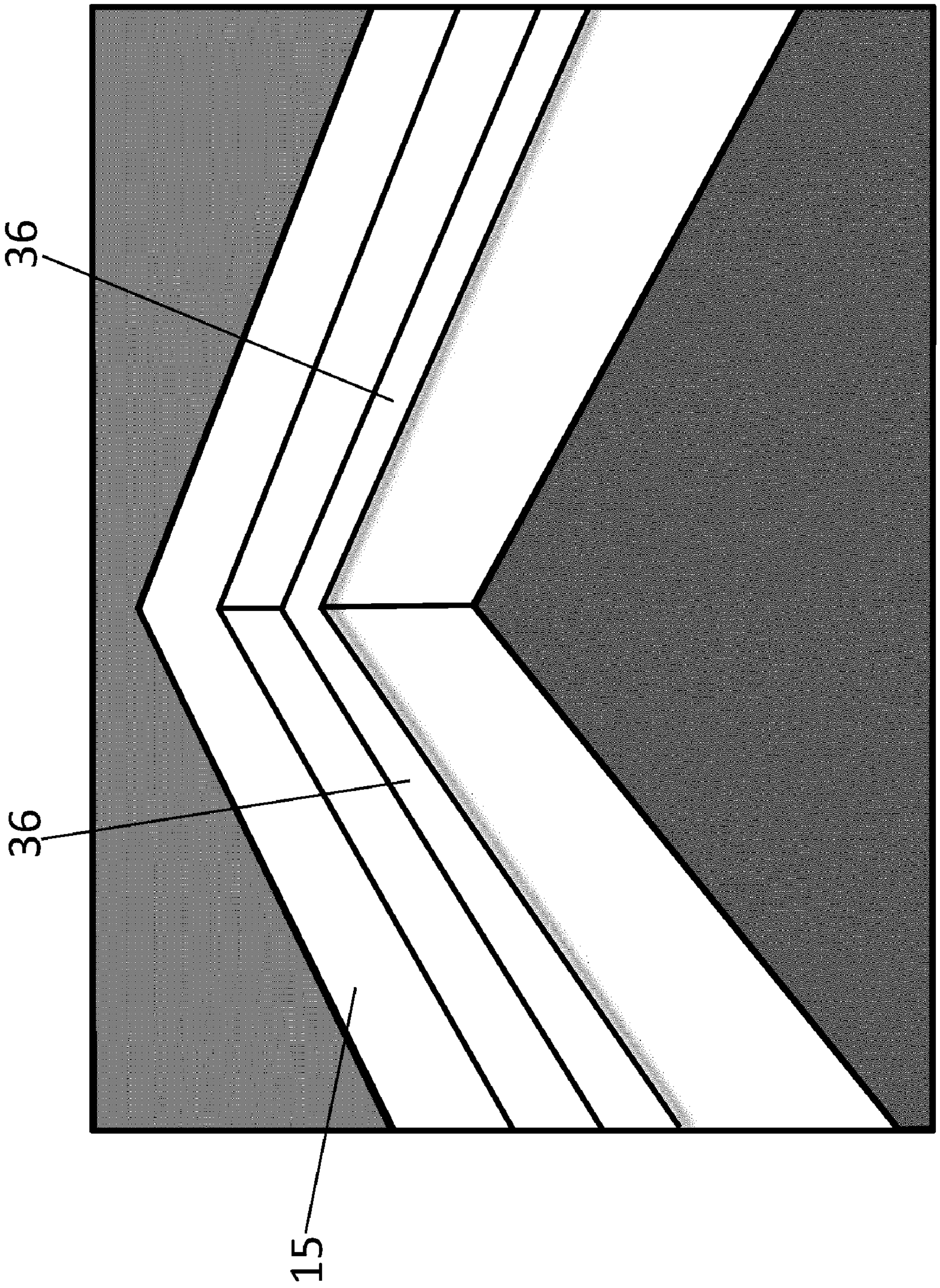
FIG. 4 is a perspective view of a corner an embodiment of a base frame.
Figure 5:
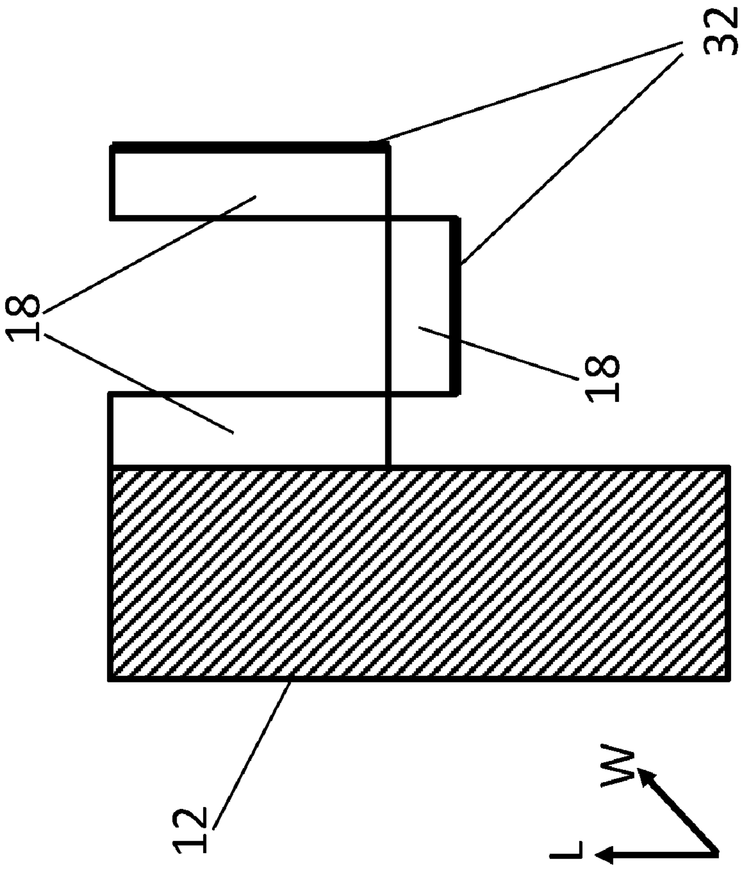
FIG. 5 is a cross-sectional side view, looking in the width (W) direction, of an embodiment of a window frame insert for an existing window frame in a fully open position.

The window frame insert and method of installing the same disclosed herein provide an insert solution that is cost-effective, insulative (preferably air-tight), customizable, easy to install, convenient, aesthetically pleasing, requires no additional gaskets or seals, and allows easy access to already existing windows. When the window frame insert (FIGS. 1-8) is used in addition to standard, single-pane windows, a heat transfer U-value of less than or equal to 1.4 watts per meter squared Kelvin ($W/m^2 \cdot K$) is achieved (as compared to a U-value of greater than 2.7

W/m$^2$·K for just the single-pane window), wherein U-value is determined in accordance with European Norm ISO 102011:2017. This demonstrates a significant improvement in insulative efficacy of over 45% for the window with the frame insert. The window frame insert also achieves significant improvement in insulative efficacy over even double-pane replacement windows. The window frame insert can also represent a large (e.g., an order of magnitude, and even a 13 times) decrease in cost as compared to double-pane replacement windows.

A window frame insert can be attached directly to an existing window frame. Alternatively, for example, if the window frame does not comprise a lip to which the insert can be attached, the window frame insert can comprise a base frame. An exterior perimeter of the base frame can be configured to mount to an inside surface of the existing window frame. For example, the exterior perimeter of the base frame can mount inside the existing window frame. Attachment of the base frame, or the window frame insert without base frame, can be with mechanical attachment (such as screws, nails, loop and hook attachments (such as Velcro), magnetic attachment) and/or chemical attachment (e.g., an adhesive, such as, glue, tape, or a combination thereof; e.g., foam tape), such as Velcro attached to the base frame and the window frame with adhesive. The base frame can be a single piece, or alternatively, the base frame can comprise two or more base frame members that are adjustable to a shape of the existing window frame. For example, the base frame can be comprised of multiple segments that together will form the full base frame. The full base frame is sized to extend around the entire internal wall of the window frame.

The base frame comprises a lip that extends from the window frame inward toward a center of the window frame. Optionally, the lip of the base frame can comprise a magnetic material, for example, a ferrous metal. The lip of the base frame can be present along the entire interior perimeter of the base frame or, alternatively, the lip can be present along only a portion of the interior perimeter of the base frame. Alternatively, either the hook attachment or loop attachment can be on the lip (e.g., to engage the other of the hook attachment or loop attachment that is on the insert).

The window frame insert can further comprise a window pane. The shape of the window pane can correspond to the shape of the opening formed by the existing window frame such that the window pane can fit into the existing window frame and attach to the base frame.

The window frame insert can optionally comprise an inner frame. The inner frame can comprise a first wall, an opposing second wall, and a third wall perpendicular to and connecting the first two walls and forming an open channel. For example, the inner frame can be a three-walled channel. The inner frame can be disposed around the outer edge of the window pane. In other words, the outer edge of the window pane can be located in the channel between the first wall and the second wall. The inner frame can be comprised of multiple segments that together will form the inner frame. For example, the inner frame can be segmented in a location where it is disposed around a living hinge mechanism of the window pane. Hence, the inner frame can allow bending of the window pane. Optionally, a gasket (e.g., foam, rubber, or the like) and/or a continuation of the frame and/or magnetic edging can be located to seal the gap around the hinge. The first wall of the channel can comprise the connector (e.g., a magnetic strip). For example, the connector can be attached to the first wall via an adhesive. The connector can attach to the lip of the base frame, thus allowing the inner frame to be mounted inside the existing window frame.

Hence, the window pane can be removably attached (i.e., removable without damage to components) to the lip of the base frame, directly, or via the first wall of the inner frame. The removable attachment can be accomplished with a connector, such as a hook and loop connector (e.g., Velcro), magnets, an adhesive such as glue, tape, etc. For example, the outer edge of the window pane or the side of the first wall opposite the channel, may comprise a magnetic strip that magnetically attaches to the lip of the base frame. For example, the magnetic strip can be attached to the window pane via an adhesive. Alternatively, or in addition, Velcro can be attached to the outer edge of the window pane or the side of the first wall opposite the channel via an adhesive. The connector can be present along the entire outer edge of the window pane or, alternatively, can be present along only a portion of the outer edge of the window pane. In this way, the window pane may be mounted and held in place within the existing window frame. For better sealing and insulative functionality the connector preferably extends along the entire outer edge of the window pane.

The window pane can have a haze value of less than or equal to 5% according to ASTM D1003-13, Procedure A, using D65 illumination, 10 degrees observer, and at the thickness of the window pane, preferably less than or equal to 2%. The window pane can have a visible light transmission value of greater than or equal to 50%, for example, greater than or equal to 70%, for example, 70%, for example, greater than or equal to 80%, for example, greater than or equal to 85%, for example, greater than or equal to 90%, for example, greater than or equal to 95%, for example, greater than or equal to 99%, as determined in accordance with ASTM D1003-00, Procedure A, using D65 illumination, 10 degrees observer, and at a thickness of 3 millimeters. A thickness of the window pane can be, for example, 0.5 millimeters to 5 millimeters, for example, 0.5 millimeters to 3 millimeters, for example, 0.5 to 2 millimeters.

A length of the window pane can be divided by a living hinge mechanism. For example, a living hinge mechanism can be a thin flexible hinge (i.e., flexure bearing) made from the same material as the window pane. In other words, one side of the window pane is a single unitary sheet, while the other side of the window pane comprises the living hinge formed into the window pane. For example, the living hinge mechanism can be integrated into the window pane as a whole without the use of separate connectors. The living hinge mechanism can be melt pressed, routed, thinned, or cut, to allow the more rigid pieces of the window pane connected by the hinge to bend along the line of the hinge. The living hinge mechanism extends across a width of the window pane from one edge to an opposite edge such that a portion of the window pane can bend at the living hinge mechanism toward another portion of the window pane.

The living hinge mechanism can comprise one or more grooves, for example, two or more grooves, for example, 4 or more grooves, for example, 6 or more grooves (e.g., 4 to 20 grooves, preferably 6 to 15 grooves, or 6 to 10 grooves), which extend across a width of the window pane, perpendicular to the length of the window pane. A cross-sectional shape of the grooves of the living hinge mechanism can be polygonal (e.g., square, rectangular, or triangular, i.e., not rounded), or rounded (e.g., semi-circular, or semi-elliptical), or a combination thereof, preferably the cross-sectional shape of the grooves is polygonal, more preferably rectangular.

A differential between a thickness of the window pane and a depth of each groove can be greater than or equal to 0.3 millimeters (mm); that is, the thickness of the window pane at the groove can be greater than or equal to 0.3 mm. Adjacent grooves can be spaced 0.2 millimeters to 2.0 millimeters apart, for example, 0.2 millimeters to 1.0 millimeters apart, for example, 0.4 millimeters to 0.7 millimeters apart. A width of each groove, measured parallel to the length of the window pane, can be 0.4 to 2.0 times a thickness of the window pane, for example, 0.4 to 0.6 times a thickness of the window pane, for example, 0.5 times a thickness of the window pane. A range of motion of the living hinge mechanism can be greater than or equal to 0 degrees, for example, from 0 to 90 degrees, for example, from 0 to 180 degrees, e.g., based upon the plane of the window pane such that 0° is no bend. The living hinge mechanism can have a range of motion of greater than 90°, preferably 90 to 180°.

The grooves can protect the living hinge mechanism from damage while the hinge is being folded over a range of motion. For example, when the living hinge mechanism is folded, the outer edges 50 of each groove 38, move toward each other, decreasing the width 41 of the groove 38 at the opening (see e.g., FIGS. 6A, 6B, and 9A-9C). The combination of the width 41 of the grooves 38, the depth 40 of the grooves 38, and the spacing 44 between the grooves, combine to determine how far the window pane can bend, from 0° to 180°). Preferably, the window pane can open 180°, and at 180°, the edges 50 of each groove 38 are in physical contact. This contact provides support to the window pane, preventing excessive bending and/or stretching of the material that forms the base of the groove 52. Hence, the depth and width of the grooves and the spacing between the grooves are preferably chosen to enable a desired angle of bending (e.g., up to 90°, and preferably up to 180°), and more preferably, to allow the desired degree of bending such that the edges of the grooves are in contact at the desired degree of bend. This compensatory approach can ensure that the protective function of the grooves persists even as the grooves' dimensions are varied.

The window insert can optionally comprise a handle mechanism. For example, the handle mechanism can extend from a bottom end of the window pane and/or the handle mechanism can extend from a top end of the window pane. For example, the handle mechanism can extend out from the second wall of the inner frame. The handle mechanism can be, for example, L-shaped or T-shaped and can mate with a receiver mechanism (e.g., another handle mechanism) located on an opposing end of the window pane or inner frame. A user can pull on the handle mechanism, detaching the magnetic connection between the magnetic strip of the window pane/inner frame and the lip of the base frame, thus opening the window frame insert. The window pane can bend up to 180 degrees along the living hinge mechanism (e.g., from a resting state where the window pane is flat). This allows a user to gain access to their existing window. The handle mechanism can be mated with the receiver mechanism, thus locking the window frame insert in an open position.

The lip of the base frame and the magnetic strip of the window pane/inner frame can form a barrier, and preferably an air-tight seal (e.g., does not allow air to pass through). The window pane and the channel forming the inner frame can also form a barrier, and preferably air-tight seal. The window frame insert will trap an insulative layer of air in between the window pane and the pane of the existing window. This results in desirable improvements in insulative efficacy and minimal heat transfer. For example, a U-value (rate of heat transfer) of the window frame insert can be 3.0 watts per meter squared Kelvin to 1.0 watts per meter squared Kelvin, for example, 2.0 watts per meter squared Kelvin to 1.0 watts per meter squared Kelvin, for example, 1.4 watts per meter squared Kelvin to 1.3 watts per meter squared Kelvin. A U-value of the window frame insert can be less than or equal to 2.5 watts per meter squared Kelvin, for example, less than or equal to 2.0 watts per meter square Kelvin, for example, less than or equal to 1.5 watts per meter squared Kelvin, as determined in accordance with European Norm ISO 102011:2017.

The window pane can further comprise a film layer adhered over the window pane. For example, the film layer can comprise a decorative image, an ultraviolet light blocking material, a mirrored surface, a tinted material, or a combination thereof.

The window pane, the inner frame, the base frame, or a combination thereof, can comprise a polymeric material. The polymeric material is chosen based upon the desired window properties, such as transparency and thermal stability. Examples of polymeric materials include, but are not limited to, polyesters, polycarbonates, polystyrenes (e.g., copolymers of polycarbonate and styrene, polyphenylene ether-polystyrene blends), polyimides (e.g., polyetherimides), acrylonitrile-styrene-butadiene (ABS), polyarylates, polyalkylmethacrylates (e.g., polymethylmethacrylates (PMMA)), polyolefins (e.g., polypropylenes (PP) and polyethylenes, high density polyethylenes (HDPE), low density polyethylenes (LDPE), linear low density polyethylenes (LLDPE)), polyamides (e.g., polyamideimides), polyarylates, polysulfones (e.g., polyarylsulfones, polysulfonamides), polyphenylene sulfides, polytetrafluoroethylenes, polyethers (e.g., polyether ketones (PEK), polyether etherketones (PEEK), polyethersulfones (PES)), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidones, polycarboranes, polyoxabicyclononanes, polydibenzofurans, polyphthalamide, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinyl chlorides), polysulfonates, polysulfides, polyureas, polyphosphazenes, polysilazanes, polysiloxanes, fluoropolymers (e.g., polyvinyl fluoride (PVF), polyvinylidene fluoride (PVDF), polyvinyl fluoride (PVF), fluorinated ethylene-propylene (FEP), polyethylene tetrafluoroethylene (ETFE)), polycarbonate-siloxane block copolymer (such as LEXAN™ EXL Resin), terephthalate ester of resorcinol (ITR) (such as LEXAN™ SLX Resin), N-phenylphenol phthaleinylbisphenol (PPP-BP) (such as LEXAN™ XHT Resin), or a combination comprising at least one of the foregoing.

The thermoplastic polymer can also comprise a polyester. Polyesters include those derived from an aliphatic, cycloaliphatic, or aromatic diol, or mixtures thereof, containing from 2 to about 10 carbon atoms and an aliphatic, cycloaliphatic, or aromatic dicarboxylic acid, and have repeating units of the following general formula:

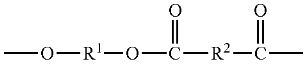

wherein n is an integer of from 2 to 6, and $R^1$ and $R^2$ are each independently a divalent $C_1$-$C_{20}$ aliphatic radical, a $C_2$-$C_{12}$ cycloaliphatic alkyl radical, or a $C_6$-$C_{24}$ aromatic radical. The polyesters can be formed from terephthalic acid and a combination of ethylene glycol and cyclohexadimethanol, for example, formed from terephthalic acid and a combination of ethylene glycol, diethylene glycol and cyclohexadimethanol. Examples of polyesters include at least one of poly(ethylene terephthalate), spiroglycol modified polyethylene terephthalate, poly-cyclohexylenedimethylene terephthalate glycol, poly(1,4-cyclohexylenedimethylene 1,4-cyclohexanedicarboxylate), and polyethyelene naphthalate, poly-cyclohexylenedimethylene-terephthalate-glycol, poly-cyclohexylenedimethylene terephthalate, or polyethylene terephthalate with diethylene glycol. The polyester can comprises poly(ethylene terephthalate) ("PET"), e.g., unmodified PET. The polyester can comprise spiroglycol modified amorphous PET.

The window pane, the inner frame, the base frame, or a combination thereof can comprise a single layer, e.g., a monolithic sheet. Optionally, the window pane, the inner frame, the base frame, or a combination thereof, can comprise a plurality of layers. For example, the thermoplastic polymer can comprise a plurality of layers greater than or equal to 4 layers, for instance, greater than or equal to 32 layers, greater than or equal to 64 layers. The total number of layers can be 8 to 512 layers, or 32 to 128 layers. The plurality of layers of the thermoplastic polymer can include less than or equal to 512 layers, or less than or equal to 256 layers, for example, less than or equal to 128 layers.

The window pane, the inner frame, the base frame, or a combination thereof, can comprise a thermoplastic sheet which is co-extruded, coated, laminated, or a combination comprising at least one of the foregoing. For example, the window pane, the inner frame, the base frame, or a combination thereof, can comprise a polycarbonate core with a co-extruded PMMA layer, a polycarbonate sheet with a silica hard coat, a polycarbonate laminated with a transparent film such as polyvinylidene fluoride (PVDF), other transparent polymer films, or a combination comprising at least one of the foregoing.

A method for producing the above-described thermoplastic polymer can include coextruding a polycarbonate stream and polyester stream to form a multilayer polymer. By coextruding polycarbonate and polyester in adjacent layers, adhesion is achieved between the layers. The method can include splitting a composite layer stream comprising a polycarbonate stream and a polyester stream from the step of coextruding to obtain two or more sub-streams, repositioning the sub-streams an overlapping manner, and contacting the sub-streams to obtain alternating layers of polycarbonate and polyester.

Also disclosed herein is a method of installing a window frame insert for an existing window frame. The method can, if not ordered to size, comprise adjusting a base frame to fit the existing window frame. For example, adjusting the base frame can comprise adjusting shape, size, length, width, height, thickness, or a combination thereof, e.g., via cutting, trimming, snapping, or a combination thereof.

The method of installing a window frame insert can further comprise mounting an exterior perimeter of the base frame inside the existing window frame, for example, via an adhesive material and/or a mechanical attachment.

The method can, if needed, further comprise adjusting a window pane and/or inner frame of the window frame insert to fit the base frame and/or existing window frame. For example, adjusting the window pane and/or inner frame can comprise adjusting shape, size, length, width, height, thickness, or a combination thereof, e.g., via cutting, trimming, snapping, or a combination thereof.

The window pane is then attached to the lip of the base frame. For example, an outer edge of the window pane can be attached to the base frame with just the connector (e.g., magnetic strip, magnetic particles, or loop and hook attachment). Alternatively, an outer edge of the window pane can be inserted into the channel forming the inner frame, the inner frame can then be attached to the base frame, e.g., with a connector (e.g., magnetic strip, magnetic particles, or loop and hook attachment). In this way, the window frame insert can be mounted and held in place within the existing window frame.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Referring now to FIGS. 1-5, shown is a window frame insert 10 for an existing window frame 12. The window frame insert 10 comprises a base frame 15, wherein an exterior edge 14 of the base frame 15 mounts inside the existing window frame 12. An interior edge of the base frame 15 comprises a lip 36, wherein the lip 36 of the base frame 15 comprises a magnetic material.

A channel 28 forms an inner frame 18. The inner frame 18 can be a single piece or can comprises two or more inner frame members 26 (FIG. 3) that are adjustable to a shape of the existing window frame 12. An outer edge 22 of the window pane 21 can insert into the channel 28, between the first wall 30 and a second wall 34.

Attached to the first wall 30 of the channel 28 can be a magnetic strip 32. The magnetic strip 32 can magnetically attach to the lip 36 of the base frame 15. Extending from a second wall 34 of the channel 28 can be a handle mechanism 20.

The window pane 21 can further comprise a film layer 25 adhered over the window pane 21. The handle mechanism 20 is L-shaped or T-shaped and can mate with a receiver mechanism 24 located on an opposing end of the window pane 21 or inner frame 18.

Figure 6B:
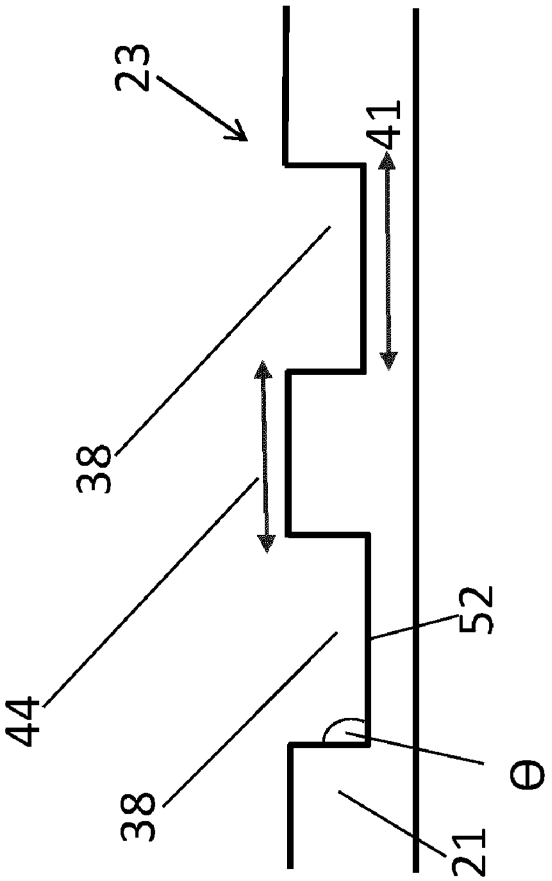
FIGS. 6A and 6B are partial cross-sectional views are simplified diagrams representing cross-sections of living hinge mechanisms with one or more rectangular grooves.
Figure 6A:
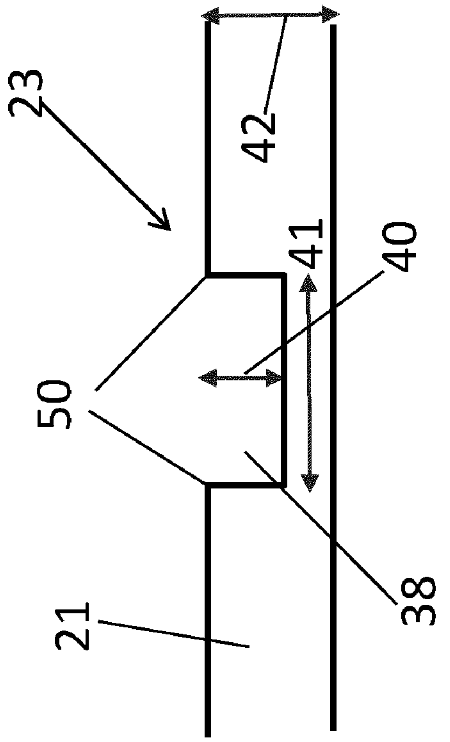
Figure 7:
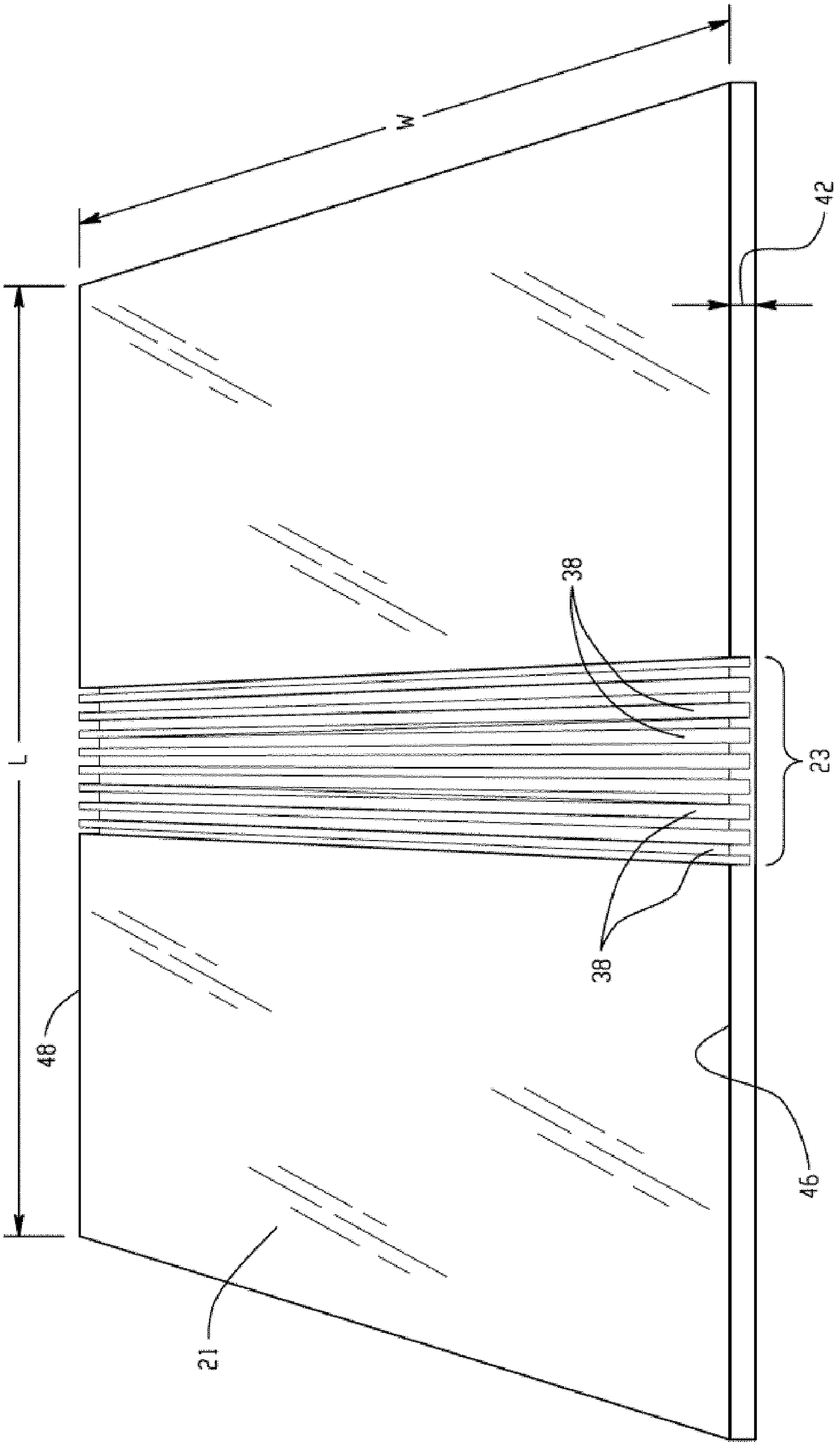
FIG. 7 is a simplified diagram representing a window pane.

Referring now to FIGS. 6A, 6B and 7, a length (L) of the window pane 21 is divided by a living hinge mechanism 23. The living hinge mechanism 23 can extend across a width (W) of the window pane 21 from a first longitudinal edge 46 to a second longitudinal edge 48.

The living hinge mechanism 23 comprises one or more grooves 38, for example, grooves 38 with a rectangular cross-sectional shape, extend across the window pane 21, perpendicular to the length (L) of the window pane 21.

A differential between a thickness 42 of the window pane 21 and a depth 40 of a groove 38 can be greater than or equal to 0.3 millimeters.

Two or more grooves can be spaced apart by a distance 44, for example, 0.2 millimeters to 1 millimeter apart. A width of a groove 41, measured parallel to the length (L) of the window pane 21, can be 0.5 times a thickness 42 of the window pane 21.

Figure 8C:
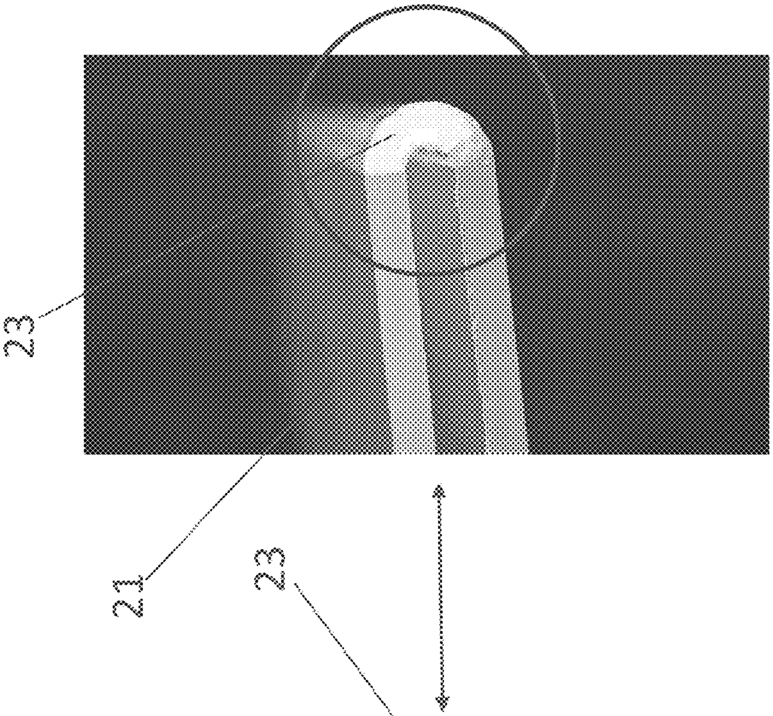
FIGS. 8A, 8B, 8C are simplified diagrams representing range of motion for a living hinge mechanism.
Figure 8B:
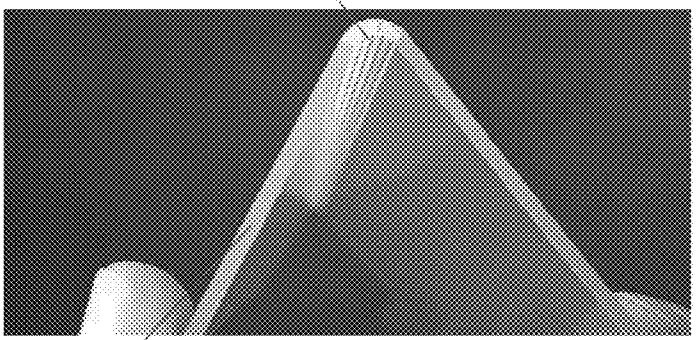
Figure 8A:
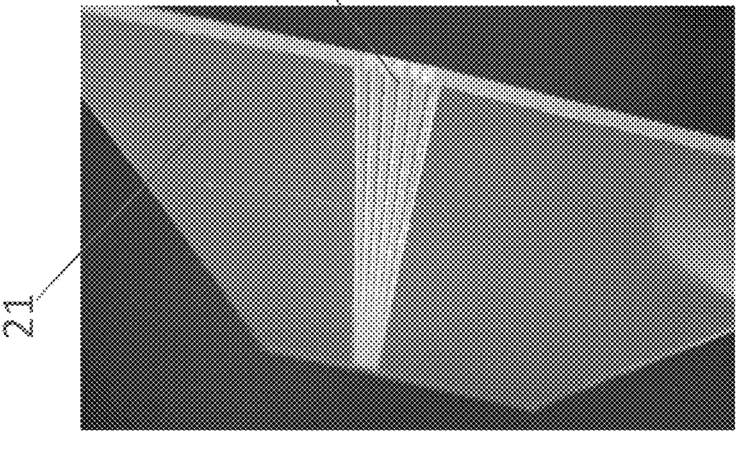
Figure 9A:
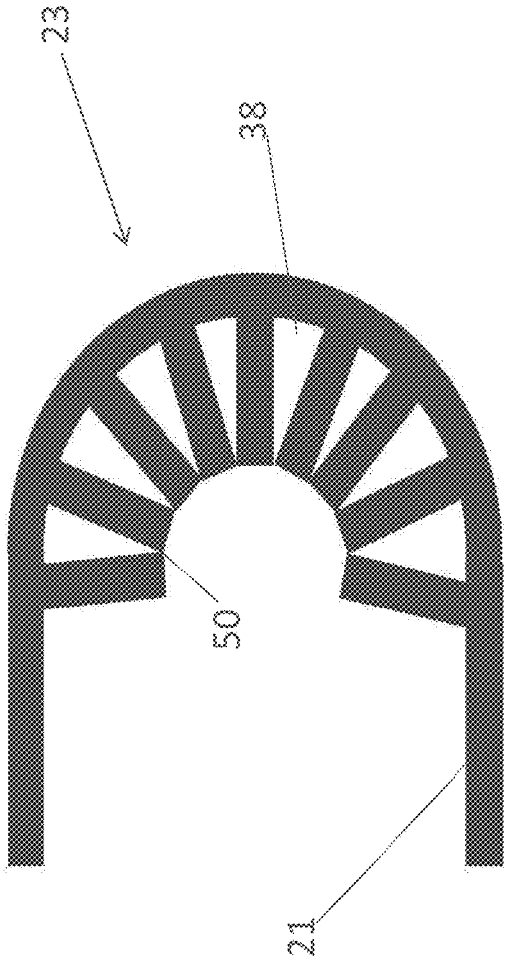
FIGS. 9A, 9B, 9C are simplified diagrams representing a zoomed in view of the living hinge mechanism of FIG. 8C.
Figure 9C:
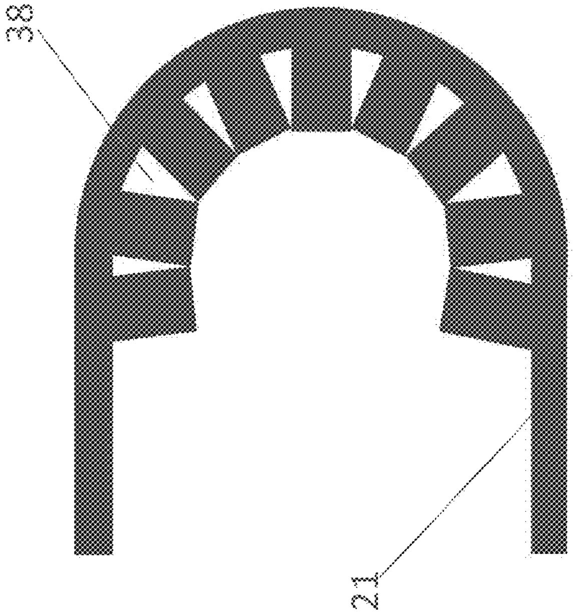
Figure 9B:
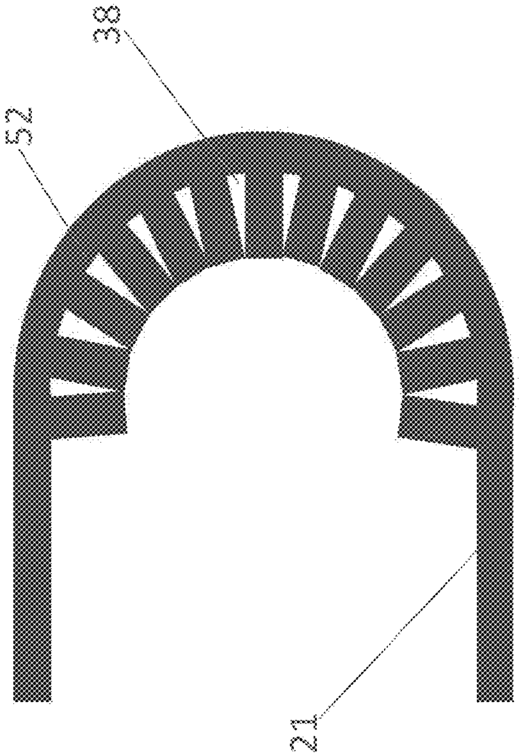

Referring now to FIGS. 8 and 9, the window pane 21 can bend along the living hinge mechanism 23 with a range of motion. For example, as shown, the living hinge mechanism 23 can bend 0° (FIG. 8A), between 0° and 180° (FIG. 8B), and 180° (FIGS. 8C and 9A-9C).

The following examples are merely illustrative of the window frame insert disclosed herein and are not intended to limit the scope hereof.

EXAMPLES

Example 1

Experimental trials were conducted. The thermal efficacy of the presently disclosed window frame insert was tested.

The cubical test chamber had a rectangular front opening (3.65 meters by 2.43 meters) made of wooden boards (50.8 mm by 203.2 mm), 609.6 mm center to center, and R30C insulation (209 mm thick). R30 foam insulation was added to a lateral wall of the cubical test chamber. All other walls of the test chamber were composed of 3 layers of 50.8 mm thick, R60 insulation.

A center wall with a metallic frame window was installed, separating the test chamber into two rooms and creating interior and exterior conditions on either side of the wall. The center wall was composed of wooden boards (50.8 mm by 101.6 mm), 406.4 mm center to center, and R13 and polyurethane foam insulation. The ratio of window glazing area to wall area was between 20% and 30%. The existing window frame was sealed with tape on the exterior side and gypsum boards were used on the interior side in order to ensure an air tight seal. The insulated and airtight test chamber generated a temperature difference across its walls (up to 38° C. on the interior side and down to 4.5° C. on the exterior side).

Thermal performance was measured using U-value (thermal transmittance), defined as the rate of heat loss through the window. The U-value of the window as a whole ($U_w$) was calculated as the sum of the glazing U-value ($U_g$) and the frame U-value ($U_f$). To measure $U_g$ and $U_f$, two experiments were performed for all configurations at steady-state (interior side heated to 38° C. and exterior side cooled to 4.5° C. until constant temperatures and flows in the center wall were achieved). $U_g$ was calculated as the heat-flow going through the window (Q), divided by the change in ambient temperature and surface resistance from the exterior side to the interior side of the window.

Heat-flow meters and temperature sensors were positioned on the glass of the existing window when no insert was used. When the insert was used, the sensors were position on the insert pane. Ambient temperature sensors were installed on both sides of the center wall.

The window insert was tested at pane thicknesses of 1 mm, 2 mm, and 3 mm. The air gap between the pane of the window insert and the existing window pane was tested at 50.8 mm and 31.75 mm. Three different thermal values are provided: R ($m^2 \cdot K/W$), U ($W/m^2 \cdot K$), and U (W/K). Thermal improvement for the window insert is measured as a percentage reduction as compared with the case where no window insert is used. Results are presented in Table 1.

TABLE 1

Thermal efficacy data

| Example | Sheet thickness | Air gap thickness | R ($m^2 \cdot K/W$) | U ($W/m^2 \cdot K$) | U (W/K) | Improvement |
|---|---|---|---|---|---|---|
| 1 | No insert | — | 0.37 | 2.72 | 3.73 | — |
| 2 | 1 mm | 50.8 mm | 0.74 | 1.36 | 1.86 | 50% |
| 3 | 2 mm | 50.8 mm | 0.74 | 1.36 | 1.86 | 50% |
| 4 | 3 mm | 50.8 mm | 0.72 | 1.38 | 1.89 | 49% |
| 5 | 3 mm | 31.75 mm | 0.75 | 1.34 | 1.84 | 51% |
| 6 | 1 mm | 31.75 mm | 0.73 | 1.37 | 1.87 | 50% |

When standard, single-pane, glazed windows were used, a heat transfer U-value of 2.72 watts per meter squared Kelvin ($W/m^2 \cdot K$) was achieved (as measured according to European Norm ISO 102011:2017). When the polycarbonate window frame insert of the present disclosure (FIGS. 1-8) was used (magnets used to create airtight seal with existing window frame) in addition to the standard, single-pane glazed windows, a heat transfer U-value of 1.34 $W/m^2 \cdot K$ was achieved. This demonstrates an improvement in insulative efficacy of over 50% for the window frame insert.

Additionally, replacement windows generally require a professional to replace the windows, while the present window frame insert does not require professional installation. Installation is simple and can be accomplished by an average home owner.

Example 2

Experimental trials were conducted. Range of motion for the living hinge mechanism of the presently disclosed window frame insert (FIGS. 1-8) was tested.

The window panes and living hinge mechanisms were formed from a sheet (LEXAN™ EXELL™ D) comprising linear polycarbonate (average molecular weight of 30,000 Daltons). The sheet further comprised a 60 micrometers thick co-extruded cap-layer on both sides of the sheet. The cap-layer comprised polycarbonate with 10 weight percent ultraviolet light absorber.

The following parameters were used: a differential between a thickness of the window pane and a depth of each groove was varied from 0.15 millimeters to 0.3 millimeters; the living hinge mechanism comprised 1 to 6 grooves; adjacent grooves were equidistantly spaced 0.2 to 0.6 millimeters apart a cross-sectional shape (taken across the groove, parallel to the length of the window pane) of the grooves was rectangular or rounded; and a width of each groove, measured parallel to the length of the window pane, was 0.5 times a thickness of the window pane. Results are presented in Table 2.

TABLE 2

Hinge bending data

| Example | No. of grooves | Groove spacing distance | Δ Pane thickness, groove depth | Groove width vs. pane thickness | Groove shape | Bends before fail |
|---|---|---|---|---|---|---|
| 7 | 3 | 0.2 mm | 0.3 mm | 0.5× | rectangular | 30 |
| 8 | 4 | 0.6 mm | 0.3 mm | 0.5× | rectangular | >5000 |

TABLE 2-continued

| Hinge bending data | | | | | | |
|---|---|---|---|---|---|---|
| Example | No. of grooves | Groove spacing distance | Δ Pane thickness, groove depth | Groove width vs. pane thickness | Groove shape | Bends before fail |
| 9 | 6 | 0.4 mm | 0.3 mm | 0.5× | round | 500 |
| 10 | 6 | 0.5 mm | 0.3 mm | 0.5× | rectangular | >5000 |
| 11 | 6 | 0.5 mm | 0.4 mm | 0.5× | rectangular | 1005 |
| 12 | 6 | 0.5 mm | 0.15 mm | 0.5× | rectangular | >5000 |
| 13 | 1 | 0.4 mm | 0.3 mm | 0.5× | rectangular | 32 |

It was surprisingly discovered that, when the cross-sectional shape of the grooves was not rounded, and when 4 or more grooves were used, living hinge mechanisms survived greater than 1000 bends, and even greater than 5000 bends from 0° to 180°, without failure (i.e., a visible crack in the sheet as determined with the unaided eye having normal vision). When the living hinge mechanism is folded, the segments of window pane material separating each of 4 or more, non-rounded grooves, can bunch together such that the edges of the grooves touch (see e.g., FIGS. 9A-9C).

When the cross-sectional shape of the grooves was rounded, or when fewer than 4 grooves were used, the living hinge mechanism failed after 500 or fewer bends (e.g., Examples 7, 9, and 13). These configurations did not provide protection against excessive bending and/or stretching of the material that forms the window pane/living hinge mechanism. When the edges of a groove do not come into contact with each other when the window pane is bent, the base of the groove can be stretched and can experience excessive bending which can result in premature failure.

As demonstrated the window frame insert and method of installing the same disclosed herein provide an insert solution that is cost-effective, insulative, easy to install, convenient, aesthetically pleasing, and allows easy access to already existing windows. Furthermore, the window frame insert can be air-tight. Gaskets and seals are optional. Gaskets and seals are not required. Finally, the window frame insert can be customizable.

The window frame insert disclosed herein include(s) at least the following aspects:

Aspect 1: A window frame insert for an existing window frame, the window frame insert comprising: a base frame, wherein an exterior perimeter of the base frame is configured to mount to an inside surface of the existing window frame, wherein the base frame comprises a lip extending toward a center of the base frame, and preferably, wherein the lip comprises a magnetic material; a window pane comprising a thermoplastic polymer, wherein a length of the window pane is divided into a first portion and a second portion by a living hinge mechanism, preferably formed into the window pane, that extends across a width of the window pane from one edge to an opposite edge such that the first portion can bend at the living hinge mechanism toward the second portion, and wherein the first portion and the second portion have a haze value of less than or equal to 5% as determined in accordance with ASTM D1003-13, preferably less than or equal to 2%; and wherein an outer edge of the window pane removably attaches to the lip of the base frame, preferably wherein the outer edge of the window pane magnetically attaches to the lip of the base frame.

Aspect 2: A window frame insert for an existing window frame, the window frame insert comprising: a window pane comprising a thermoplastic polymer, wherein a length of the window pane is divided into a first portion and a second portion by a living hinge mechanism, preferably formed into the window pane, that extends across a width of the window pane from one edge to an opposite edge such that the first portion can bend at the living hinge mechanism toward the second portion, and wherein an outer edge of the window pane removably attaches to the existing window frame, and preferably wherein the first portion and the second portion have a haze value of less than or equal to 5% as determined in accordance with ASTM D1003-13, preferably less than or equal to 2%.

Aspect 3: The window frame insert of Aspect 2, further comprising a base frame with a lip extending orthogonally from a side toward a center of the base frame, wherein the side is configured to mount to an inside surface of the existing window frame, and wherein an outer edge of the window pane connects to the lip.

Aspect 4: The window frame insert of Aspect 3, wherein the lip comprises a magnetic material and wherein the outer edge of the window pane magnetically attaches to the lip.

Aspect 5: The window frame insert of any of the preceding Aspects, wherein the living hinge mechanism comprises two or more grooves, preferably 4 or more grooves, more preferably 6 or more grooves, which extend across the width of the window pane, perpendicular to the length of the window pane.

Aspect 6: The window frame insert of Aspect 5, wherein each groove has a depth, a width, and top edges, and wherein the grooves are spaced apart a distance, and wherein the depth, width, and distance enable the first portion to bend toward the second portion until the top edges of a groove contact each other; preferably wherein the first portion is enabled to move up to 180°, more preferably wherein the first portion is enabled to move 90° to 180°.

Aspect 7: The window frame insert of any of Aspects 5-6, wherein a differential between a thickness of the window pane and a depth of each groove is greater than or equal to 0.3 millimeters.

Aspect 8: The window frame inert of any of Aspects 5-7, wherein two or more grooves are spaced 0.2 millimeter to 2 millimeters apart, preferably 0.2 millimeters to 1 millimeter apart, more preferably 0.4 millimeters to 0.7 millimeters apart.

Aspect 9: The window frame insert of any of Aspects 5-8, wherein a width of each groove, measured parallel to the length of the window pane, is 0.4 to 0.6 times a thickness of the window pane.

Aspect 10: The window frame insert of any of the preceding aspects, wherein a thickness of the window pane is 0.5 millimeters to 5 millimeters, preferably 0.5 millimeters to 3 millimeters, more preferably 0.5 millimeters to 2 millimeters.

Aspect 11: The window frame insert of Aspect 1 or 3, wherein the base frame comprises two or more base frame members that are adjustable to a shape of the existing window frame.

Aspect 12: The window frame insert of Aspect 1 or 3, wherein the lip of the base frame is present along the entire interior perimeter of the base frame.

Aspect 13: The window frame insert of Aspect 1 or 3, wherein the lip of the base frame and the window pane form an air-tight seal.

Aspect 14: The window frame insert of any of the preceding aspects, wherein the thermoplastic polymer comprises polycarbonate.

Aspect 15: The window frame insert of any of the preceding aspects, wherein the window pane has a visible light transmission value of greater than or equal to 50%, preferably greater than or equal to 90%, more preferably greater than or equal to 95%, even more preferably greater than or equal to 99%, as determined in accordance with ASTM D1003-00, Procedure A, using D65 illumination, 10 degrees observer, and at a thickness of 3 millimeters.

Aspect 16: The window frame insert of any of the preceding aspects, wherein a U-value of the window frame insert is less than or equal to 2.5 watts per meter squared Kelvin, preferably less than or equal to 2.0 watts per meter square Kelvin, more preferably less than or equal to 1.5 watts per meter squared Kelvin, as determined in accordance with European Norm ISO 102011:2017.

Aspect 17: The window frame insert of any of the preceding aspects, wherein the window pane further comprises a film layer adhered over the window pane, wherein the film layer comprises a decorative image, an ultraviolet light blocking material, a mirrored surface, a tinted material, or a combination thereof.

Aspect 18: The window frame insert of Aspect 1 or 3, further comprising a channel forming an inner frame, wherein an outer edge of the window pane is located in the channel between a first wall and a second wall of the channel, wherein the first wall of the channel removably attaches to the lip of the base frame, preferably wherein the first wall of the channel comprises a magnetic strip configured to magnetically attach to the lip of the base frame.

Aspect 19: The window frame insert of any of the preceding aspects, wherein a handle mechanism extends from an end of the window pane.

Aspect 20: The window frame insert of Aspect 19, wherein the handle mechanism can mate with a receiver mechanism located on an opposing end of the window pane, and preferably wherein the handle mechanism has a hook to mate with the receiver mechanism, more preferably wherein the handle mechanism is L-shaped or T-shaped.

Aspect 21: The window frame insert of any of the preceding aspects, wherein a range of motion of the living hinge mechanism is between 0 and 180 degrees.

Aspect 22: The window frame insert of any of the preceding aspects, wherein the window pane is a single contiguous sheet of thermoplastic material comprising the first portion, second portion and the living hinge.

Aspect 23: A method of installing the window frame insert of any of the preceding aspects, the method comprising: adjusting a base frame of the window frame insert to fit the existing window frame, wherein an interior perimeter of the base frame comprises a lip, wherein the lip of the base frame comprises a magnetic material; mounting an exterior perimeter of the base frame inside the existing window frame; adjusting the window pane to fit the base frame; and attaching an outer edge of the window pane to the lip of the base frame, wherein a length of the window pane is divided into a first portion and a second portion by a living hinge mechanism, preferably formed into the window pane, that extends across a width of the window pane from one edge to an opposite edge such that the first portion can bend at the living hinge mechanism toward the second portion.

Aspect 24: The method of Aspect 23, wherein adjusting the base frame or window pane comprises adjusting shape, size, length, width, height, thickness, or a combination thereof, via cutting, trimming, snapping, or a combination thereof.

Aspect 25: The method of Aspect 23-24, further comprising mounting the exterior perimeter of the base frame inside the existing window frame via an adhesive, preferably, glue, tape, or a combination of glue and tape.

Aspect 26: The method of Aspect 23-25, wherein the lip of the base frame and the window pane form an air-tight seal.

Aspect 27: The method of Aspect 23-26, wherein the outer edge magnetically attaches to the lip.

In a certain embodiment, the invention also relates to a window frame insert for an existing window frame, the window frame insert comprising:

a window pane comprising a thermoplastic polymer, wherein a length of the window pane is divided into a first portion and a second portion by a living hinge mechanism, preferably formed into the window pane, that extends across a width of the window pane from one edge to an opposite edge such that the first portion can bend at the living hinge mechanism toward the second portion, and wherein the first portion and the second portion have a haze value of less than or equal to 5% as determined in accordance with ASTM D1003-13, preferably less than or equal to 2%; and wherein an outer edge of the window pane is removably attachable to the existing window frame.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The modifier "about" used in connection with a quantity is inclusive of the stated value and has the meaning dictated by the context (e.g., includes the degree of error associated with measurement of the particular quantity). The notation "+10%" means that the indicated measurement can be from an amount that is minus 10% to an amount that is plus 10% of the stated value. The terms "front", "back", "bottom", and/or "top" are used herein, unless otherwise noted, merely for convenience of description, and are not limited to any one position or spatial orientation. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A window frame insert for an existing window frame, the window frame insert comprising:

a window pane comprising a thermoplastic polymer, one side of the window pane is a single unitary sheet, while the other side of the window pane comprises a living hinge formed into the window pane, wherein a length of the window pane is divided into a first portion and a second portion by the living hinge mechanism that extends across a width of the window pane from one edge to an opposite edge such that the first portion is configured to bend at the living hinge mechanism toward the second portion, and wherein the first portion and the second portion have a haze value of less than or equal to 5% as determined in accordance with ASTM D1003-13; and wherein an outer edge of the window pane removably attaches to the existing window frame:

wherein the living hinge mechanism comprises four or more grooves, which extend across the width of the window pane, perpendicular to the length of the window pane;

wherein each groove has a depth, a width, and top edges, and wherein the grooves are spaced apart a distance, and wherein the depth of the grooves, the width of the grooves, and the spacing between the grooves distance enable the first portion to bend toward the second portion, such that when the living hinge mechanism is folded, the top edges of each groove move toward each other, decreasing the width of the groove at respective groove openings, until the top edges of adjacent grooves contact each other, to provide a desired degree of bend, wherein the first portion is enabled to move up to 180°.

2. The window frame insert of claim 1, wherein a differential between a thickness of the window pane and a depth of each groove is greater than or equal to 0.3 millimeters.

3. The window frame inert of claim 1, wherein the grooves are spaced 0.2 millimeter to 2 millimeters apart.

4. The window frame insert of claim 2, wherein a width of each groove, measured parallel to the length of the window pane, is 0.4 to 0.6 times a thickness of the window pane.

5. The window frame insert of claim 1, further comprising a base frame, wherein an exterior perimeter of the base frame is configured to mount to an inside surface of the existing window frame, wherein the base frame comprises a lip extending toward a center of the base frame.

6. The window frame insert of claim 5, further comprising a channel forming an inner frame, wherein the outer edge of the window pane is located in the channel between a first wall and a second wall of the channel, wherein the first wall of the channel removably attaches to the lip of the base frame.

7. The window frame insert of claim 1, wherein a handle mechanism extends from an end of the window pane.

8. The window frame insert of claim 7, wherein the handle mechanism is configured to mate with a receiver mechanism located on an opposing end of the window pane.

9. The window frame insert of claim 1, wherein a thickness of the window pane is 0.5 millimeters to 5 millimeters.

10. The window frame insert of claim 5, wherein the base frame comprises two or more base frame members that are adjustable to a shape of the existing window frame.

11. The window frame insert of claim 5, wherein the lip of the base frame is present along the entire interior perimeter of the base frame, and wherein the lip of the base frame and the window pane form an air-tight seal.

12. The window frame insert of claim 1, wherein the window pane has a visible light transmission value of greater than or equal to 50%, as determined in accordance with ASTM D1003-00, Procedure A, using D65 illumination, 10 degrees observer, and at a thickness of 3 millimeters.

13. The window frame insert of claim 1, wherein the living hinge mechanism is formed into the window pane.

14. The window frame insert of claim 1, wherein the lip comprises a magnetic material.

15. The window frame insert of claim 1, wherein the outer edge of the window pane magnetically attaches to the lip of the base frame.

16. A window frame insert for an existing window frame, the window frame insert comprising:

a window pane comprising a thermoplastic polymer, wherein a length of the window pane is divided into a first portion and a second portion by a living hinge mechanism that extends across a width of the window pane from one edge to an opposite edge such that the first portion can bend at the living hinge mechanism toward the second portion, and wherein the first portion and the second portion have a haze value of less than or equal to 5% as determined in accordance with ASTM D1003-13; and wherein an outer edge of the window pane removably attaches to the existing window frame;

wherein the window frame insert further comprises a base frame, wherein an exterior perimeter of the base frame is configured to mount to an inside surface of the existing window frame, wherein the base frame comprises a lip extending toward a center of the base frame.

17. The window frame insert of claim 16, further comprising a channel forming an inner frame, wherein the outer edge of the window pane is located in the channel between a first wall and a second wall of the channel, wherein the first wall of the channel removably attaches to the lip of the base frame.

18. The window frame insert of claim 16, wherein:

the base frame comprises two or more base frame members that are adjustable to a shape of the existing window frame.

* * * * *